(12) United States Patent
    Kawamura

(10) Patent No.: US 11,245,333 B2
(45) Date of Patent: Feb. 8, 2022

(54) POWER CONVERSION DEVICE

(71) Applicant: Mitsubishi Electric Corporation, Tokyo (JP)

(72) Inventor: Mao Kawamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 700 days.

(21) Appl. No.: 16/071,115

(22) PCT Filed: Mar. 4, 2016

(86) PCT No.: PCT/JP2016/056857
§ 371 (c)(1),
(2) Date: Jul. 19, 2018

(87) PCT Pub. No.: WO2017/149776
PCT Pub. Date: Sep. 8, 2017

(65) Prior Publication Data
US 2021/0211054 A1    Jul. 8, 2021

(51) Int. Cl.
*H02M 3/158*    (2006.01)
*H02M 1/14*    (2006.01)
*H02M 1/00*    (2006.01)

(52) U.S. Cl.
CPC ........... *H02M 3/1584* (2013.01); *H02M 1/14* (2013.01); *H02M 1/0064* (2021.05); *H02M 3/1586* (2021.05)

(58) Field of Classification Search
CPC .............. H02M 1/14; H02M 1/143; H02M 2001/0064; H02M 3/1584; H02M 2003/1586
See application file for complete search history.

(56) References Cited

U.S. PATENT DOCUMENTS

| 4,748,397 A | 5/1988 | Ogawa et al. |
| 2006/0208713 A1* | 9/2006 | Tsuruya ................. H02M 1/14 |
| | | 323/272 |

(Continued)

FOREIGN PATENT DOCUMENTS

| CN | 102197577 A | 9/2011 |
| CN | 104885169 A | 9/2015 |

(Continued)

OTHER PUBLICATIONS

Communication dated Mar. 6, 2019, from the European Patent Office in counterpart European Application No. 16892615.2.

(Continued)

*Primary Examiner* — Fred E Finch, III
(74) *Attorney, Agent, or Firm* — Sughrue Mion, PLLC; Richard C. Turner

(57) ABSTRACT

Provided is a power conversion device using a magnetic coupling reactor and being capable of reducing the number of parts and reducing the size of not only the magnetic coupling reactor but also an input capacitor. The magnetic coupling reactor is connected between a semiconductor switch element group, which executes power conversion, and the input capacitor. The coupling factor of two reactors in the magnetic coupling reactor is kept to a value equal to or less than a set value, for example, 0.8. The set value takes into consideration an area in which a ripple current of the input capacitor increases rapidly in response to a rise in coupling factor. The ripple current flowing in the input capacitor is reduced by thus setting the coupling factor.

6 Claims, 15 Drawing Sheets

(56) References Cited

U.S. PATENT DOCUMENTS

| | | | |
|---|---|---|---|
| 2009/0066307 A1* | 3/2009 | Osterhout | H02M 3/1588 323/283 |
| 2009/0128101 A1 | 5/2009 | Skinner | |
| 2009/0262555 A1* | 10/2009 | Asuke | H02M 3/1584 363/16 |
| 2012/0249105 A1* | 10/2012 | Nussbaum | H01F 27/2804 323/283 |
| 2012/0300523 A1* | 11/2012 | Sugiyama | H02M 3/1584 363/131 |
| 2013/0141199 A1* | 6/2013 | Hayes | H01F 38/02 336/5 |
| 2015/0070942 A1* | 3/2015 | Terui | H02M 3/33507 363/21.01 |
| 2016/0111203 A1 | 4/2016 | Yamamoto | |
| 2016/0329811 A1* | 11/2016 | Du | H02M 1/14 |
| 2017/0085189 A1* | 3/2017 | Madsen | H02M 3/33546 |
| 2017/0098998 A1* | 4/2017 | Zhou | H02M 3/1584 |
| 2019/0058411 A1* | 2/2019 | Kitamoto | B60L 15/007 |

FOREIGN PATENT DOCUMENTS

| | | | | |
|---|---|---|---|---|
| EP | 2 538 531 A1 | 12/2012 | | |
| JP | 61-142961 A | 6/1986 | | |
| JP | 2009-005579 A | 1/2009 | | |
| JP | 2009273280 A | 11/2009 | | |
| JP | 2010104074 A | 5/2010 | | |
| JP | 2012-065453 A | 3/2012 | | |
| JP | 2014-127637 A | 7/2014 | | |
| JP | 2015056940 A | * | 3/2015 | H02M 3/1584 |
| JP | 2015-231311 A | 12/2015 | | |
| WO | 2010/047413 A2 | 4/2010 | | |
| WO | 2014/141371 A1 | 9/2014 | | |
| WO | WO-2014141371 A1 | * | 9/2014 | H02M 3/1584 |

OTHER PUBLICATIONS

Communication dated, from Japanese Patent Office in counterpart Feb. 19, 2019 in counterpart application No. 2018-502494.
Takahiro Kawashima, "outside trinominal, current balance control of interleave method boost chopper circuit", Heisei 18(2006); p. 484.
Office Action dated Jun. 10, 2020 in Chinese Application No. 201680082676.7.
Takahiro Kawashima et al., "Interleave Hoshiki Shoatsu Chopper Kairo no Denryu Heiko Seigyo", Heisei 18 Nendo Joint Convention Record of Institutes of Electrical and Information Engineers, Oct. 2006, p. 484, Chugoku Branch, Japan.
International Search Report of PCT/JP2016/056857 dated May 24, 2016 [PCT/ISA/210].

* cited by examiner

MODE 4 (D>0.5)

POWER CONVERSION DEVICE

CROSS REFERENCE TO RELATED APPLICATIONS

This application is a National Stage of International Application No. PCT/JP2016/056857, filed Mar. 4, 2016.

TECHNICAL FIELD

The present invention relates to a power conversion device including a coupling reactor and a capacitor, and more particularly, to a coupling coefficient of a coupling reactor at which a size and cost are reduced.

BACKGROUND ART

Rapid changes in global environment typified by global warming and matters concerning the use of energy resources are a major topic of discussion in today's world, and electric vehicles (EVs), as well as hybrid automobiles including hybrid electric vehicles (HEVs) and plug-in hybrid electric vehicles (PHEVs), are being developed as ecologically friendly automobiles.

In hybrid automobiles in which an engine and a traction motor are mounted to use one or both of the engine and the traction motor as a main drive source, a boost converter or a similar power conversion device has been used in order to optimize the battery voltage and the drive voltage of an inverter, which is connected to the traction motor.

The boost converter or similar power conversion device for automobiles of this type is demanded to be smaller in size and loss with the advancement in power electronics technology. As an example of the related art, a converter circuit using a reactor for a multi-phase converter is disclosed in which the reactor includes a core and multi-phase coils wound around the core and magnetically coupled to each other.

CITATION LSIT

Patent Literature

[PTL 1] JP 2012-65453 A

SUMMARY OF INVENTION

Technical Problem

A boost converter circuit using a magnetic coupling reactor of the related art has the following problem:

In a boost converter using a magnetic coupling reactor of the related art, ripple current components of reactors of the respective phases switch in the same phase, unlike in an interleave configuration, which means that the total ripple current of the reactors has an amplitude that is the sum of the ripple currents of the respective phases. The ripple current of a filtering capacitor provided upstream of the magnetic coupling reactor is accordingly increased. This gives rise to a problem of an increase in size of the capacitor and in manufacturing cost.

The present invention has been made to solve the problem described above, and it is an object of the present invention to provide a power conversion device free from the possibility of an increase in size of a capacitor in a multi-phase converter using a magnetic coupling reactor by adjusting the coupling factor of the magnetic coupling reactor.

Solution to Problem

According to one embodiment of the present invention, there is provided a power conversion device, which is configured to convert a voltage input from a power source into a desired direct current voltage, the power conversion device including: a first semiconductor switching element and a second semiconductor switching element, which are connected in series between a positive output terminal and a negative output terminal; a third semiconductor switching element and a fourth semiconductor switching element, which are connected in series between the positive output terminal and the negative output terminal at a point closer to the output terminals than the first semiconductor switching element and the second semiconductor switching element are; a controller, which is configured to control on/off of each of the first semiconductor switching element, the second semiconductor switching element, the third semiconductor switching element, and the fourth semiconductor switching element; a magnetic coupling reactor including a first winding wire and a second winding wire, which are wound around a shared iron core so as to be magnetically coupled to each other in opposite directions at a turn ratio of 1:1, the first winding wire being connected between a connection point connecting the first semiconductor switching element to the second semiconductor switching element and a positive input terminal, the second winding wire being connected between a connection point connecting the third semiconductor switching element to the fourth semiconductor switching element and the positive input terminal; and an input capacitor, which is configured to reduce a ripple current, the input capacitor being connected, on a positive side thereof, to the positive input terminal and an input side of the magnetic coupling reactor, the input capacitor being connected, on a negative side thereof, to a negative input terminal and the negative output terminal, wherein the magnetic coupling reactor has a coupling factor equal to or less than a set value, the set value being determined by taking into consideration an area in which the ripple current of the input capacitor increases rapidly in response to a rise in coupling factor.

Advantageous Effects of Invention

According to the present invention, in the power conversion device provided with the multi-phase converter in which the magnetic coupling reactor element is included, a ripple current flowing into the capacitor that is provided upstream of the magnetic coupling reactor can be suppressed and the size of the capacitor can be reduced by keeping the coupling factor of the magnetic coupling reactor to a value equal to or less than a set value. In this manner, it is possible to provide a small-sized, highly efficient power conversion device having a small number of parts.

DESCRIPTION OF EMBODIMENTS

Now, a power conversion device according to each of embodiments of the present invention is described with reference to the drawings. In each of the embodiments, the same or corresponding portions are denoted by the same reference symbols, and the overlapping description thereof is omitted.

First Embodiment

Figure 1:
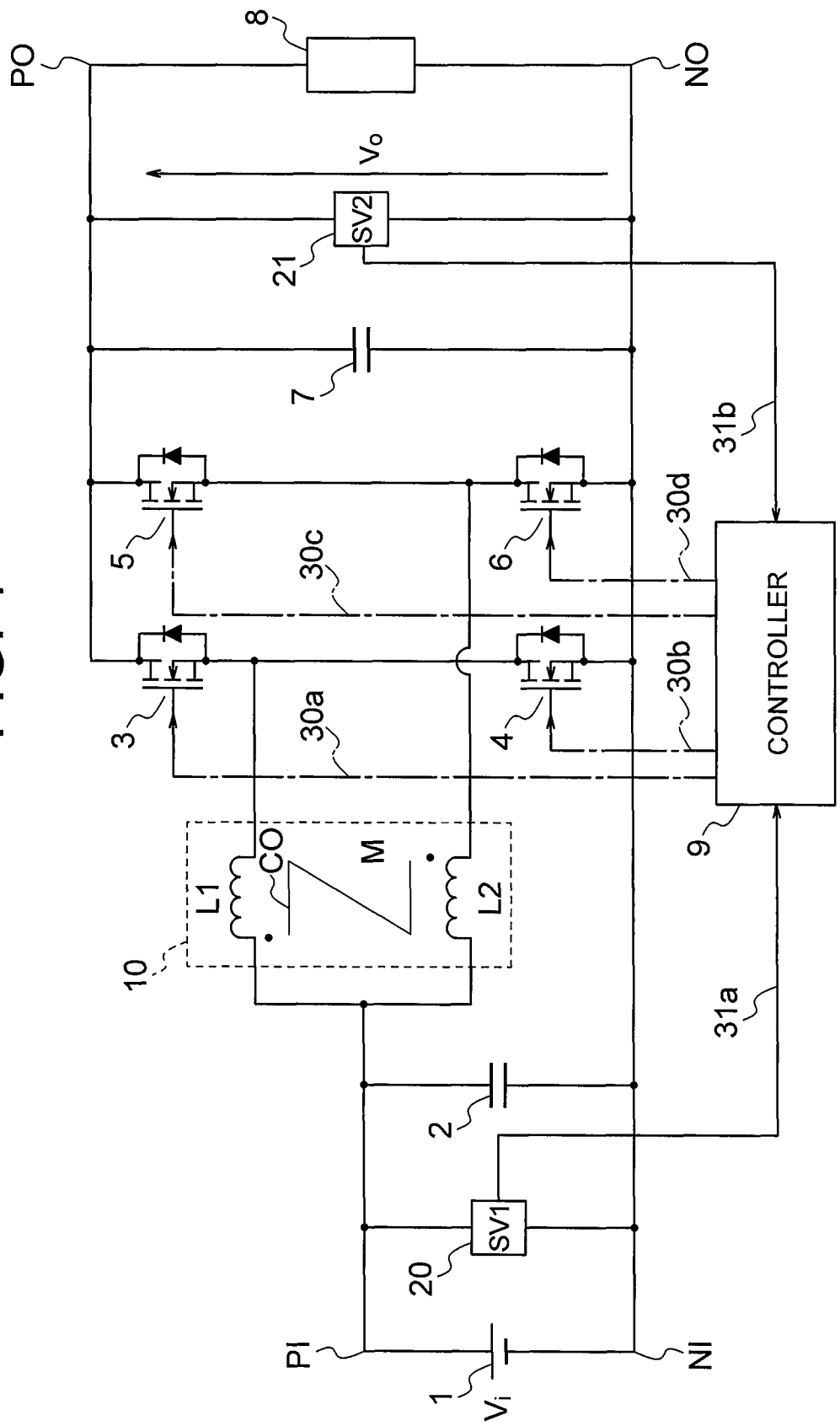
FIG. 1 is a schematic configuration diagram for illustrating a power conversion device according to a first embodiment of the present invention.

FIG. 1 is a schematic configuration diagram for illustrating a power conversion device according to a first embodiment of the present invention. In FIG. 1, an electricity storage 1, which is a power source, outputs a direct current voltage. When the power conversion device is applied to an electric vehicle or a hybrid automobile, the electricity storage 1 is constructed typically from a nickel-metal hydride battery, a lithium-ion battery, or a similar secondary battery. A load 8 connected downstream of the power conversion device is constructed from, for example, an inverter.

The power conversion device includes an input power detection circuit 20, which detects the voltage of the electricity storage 1, an output voltage detection circuit 21, which detects the voltage of a smoothing capacitor 7, and components provided between the circuits 20 and 21. An input capacitor 2 is connected in parallel to the electricity storage 1 in order to remove a ripple current in the power conversion device. A magnetic coupling reactor 10 in which a reactor L1 and a reactor L2 are arranged so as to magnetically couple to each other is connected on the downstream side of the input capacitor 2. A switching element group made up of a semiconductor switching element 3 and a semiconductor switching element 4, which are a first-stage switching element pair, and a semiconductor switching element 5 and a semiconductor switching element 6, which are a second-stage switching element pair, is connected downstream of the magnetic coupling reactor 10. The smoothing capacitor 7 is connected downstream of the second-stage switching element pair.

The switching element group is a group of, for example, power metal-oxide-semiconductor field-effect transistors (MOSFETs), and is made up of the first semiconductor switching element 3 and the second semiconductor switching element 4, which are connected in series between a positive output terminal PO and a negative output terminal NO, and the third semiconductor switching element 5 and the fourth semiconductor switching element 6, which are connected in series between the positive output terminal PO and the negative output terminal NO on the side closer to the output terminals than the first semiconductor switching element 3 and the second semiconductor switching element 4 are.

Drain terminals of the semiconductor switching element 3 and the semiconductor switching element 5 are connected to the positive side of the smoothing capacitor 7 and the positive output terminal PO. Source terminals of the semiconductor switching element 4 and the semiconductor switching element 6 are connected to the negative side of the smoothing capacitor 7 and the negative output terminal NO. A source terminal of the semiconductor switching element 3 and a drain terminal of the semiconductor switching element 4 are connected to each other at a connection point connected to the output side of the reactor L1 of the magnetic coupling reactor 10. A source terminal of the semiconductor switching element 5 and a drain terminal of the semiconductor switching element 6 are connected to each other at a connection point connected to the output side of the reactor L2 of the magnetic coupling reactor 10.

In the magnetic coupling reactor 10, a first winding wire and a second winding wire are wound around a shared iron core, which is symbolically represented by "CO", so as to be magnetically coupled to each other in opposite directions at a turn ratio of 1:1. The first winding wire is represented by the reactor L1 connected between the connection point connecting the first semiconductor switching element 3 to the second semiconductor switching element 4 and a positive input terminal PI. The second winding wire is represented by the reactor L2 connected between the connection point connecting the third semiconductor switching element 5 to the fourth semiconductor switching element 6 and the positive input terminal PI.

The positive side of the input capacitor 2 is connected to the positive input terminal PI and the input side of the magnetic coupling reactor 10. The negative side of the input capacitor 2 is connected to a negative input terminal NI and the negative output terminal NO.

A controller 9 uses control lines 30a, 30b, 30c, and 30d to control the on/off of the first-stage semiconductor switching elements 3 and 4 and the second-stage semiconductor switching elements 5 and 6 by switching on/off of the semiconductor switching elements with a set dead time interposed between on and off. The controller 9 uses a signal line 31a and a signal line 31b to obtain voltage detection values from the input voltage detection circuit (SV1) 20 and the output voltage detection circuit (SV2) 21, respectively. An input voltage is denoted by Vi, and an output voltage is denoted by Vo.

In actuality, a harness or the like is used to connect the power conversion device and the electricity storage 1 to each other, which means that there is a parasitic inductance component. This makes a high-frequency impedance high, thereby causing a ripple current of the power conversion device to flow in the input capacitor 2.

Figure 15:
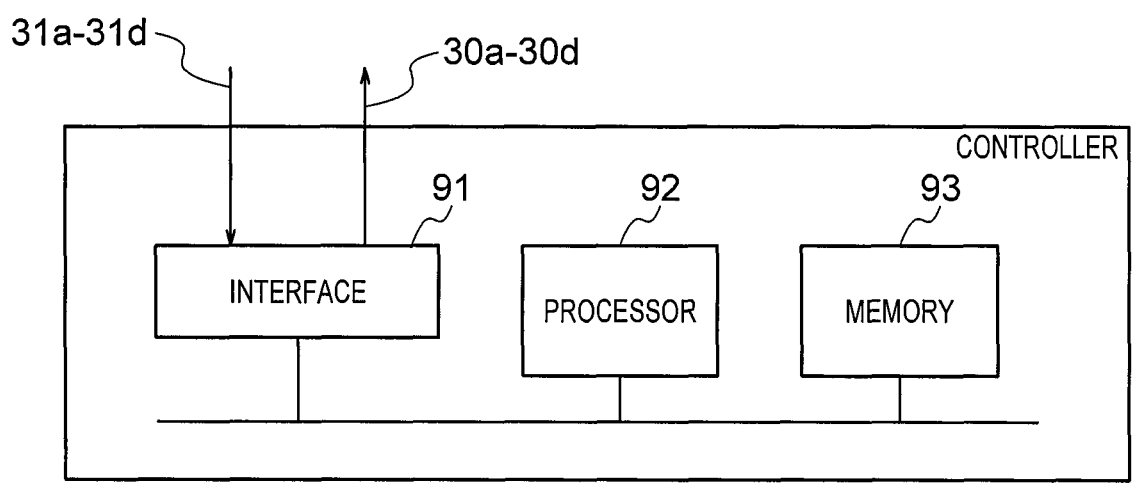
FIG. 15 is a configuration diagram for illustrating an example of the configuration of a controller in the power conversion device according to the present invention.

The controller 9 roughly includes, for example, a processor 92, a memory 93, and an interface 91 as illustrated in FIG. 15. Detection signals from, for example, the input voltage detection circuit 20, the output voltage detection circuit 21, and reactor current detection circuits 22a and 22b described later, are input to the controller 9 through the signal lines 31a and 31b via an interface 91. On the basis of the detection signals, the controller 9 executes arithmetic processing with the use of a program and control data stored in advance in the memory 93. The controller 9 then outputs control signals based on the result of the arithmetic processing to the semiconductor switching elements 3 to 6 through the control lines 30a to 30d via the interface 91.

The operation principle of the power conversion device according to the first embodiment of the present invention is described below. The power conversion device according to the first embodiment has four operation modes, which are illustrated in FIG. 2 to FIG. 5 and distinguished from one another by the states of the semiconductor switching elements.

Figure 2:
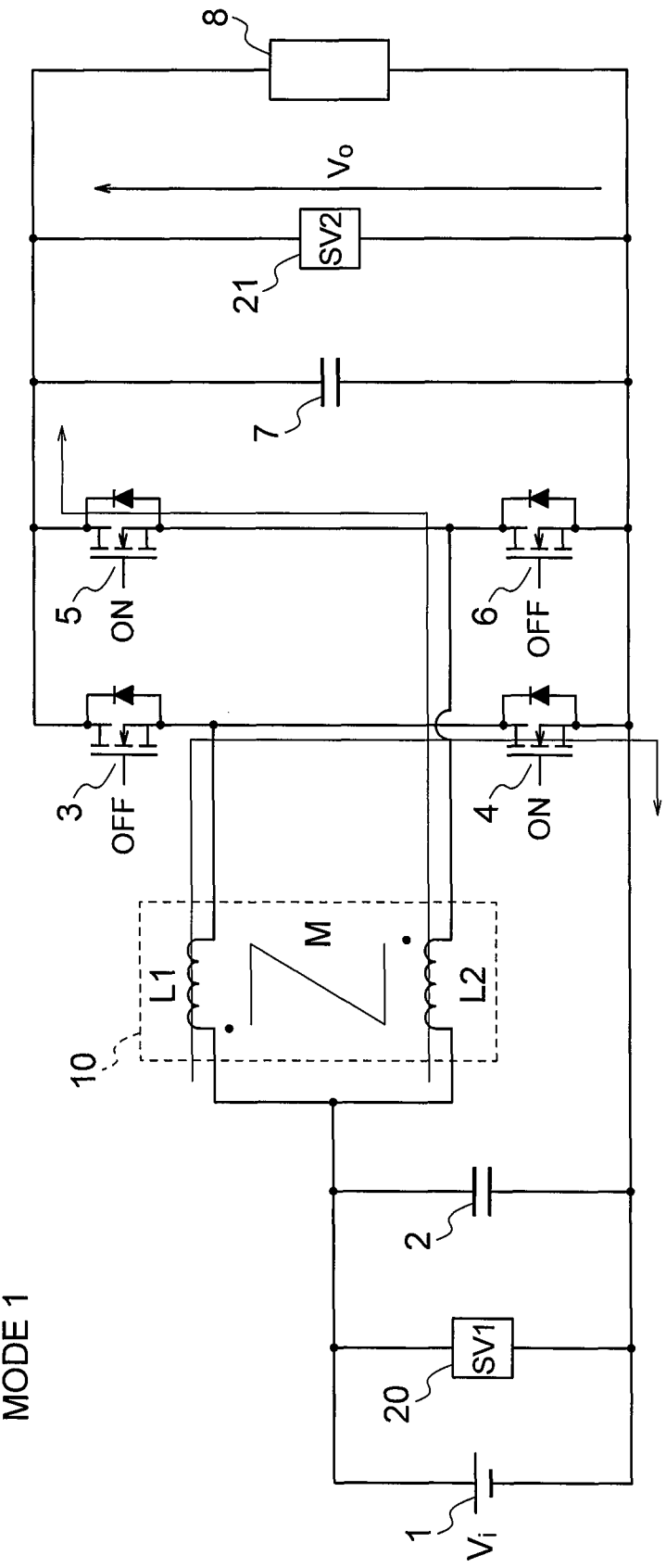
FIG. 2 is a diagram for illustrating a switching mode of semiconductor switching elements in the power conversion device according to the first embodiment of the present invention.

Mode 1 of FIG. 2 is a state in which the semiconductor switching element 4 is switched on and the semiconductor switching element 6 is switched off. The semiconductor switching element 3, which is paired with the semiconductor switching element 4, is switched off, and the semiconductor switching element 5, which is paired with the semiconductor switching element 6, is switched on.

Figure 3:
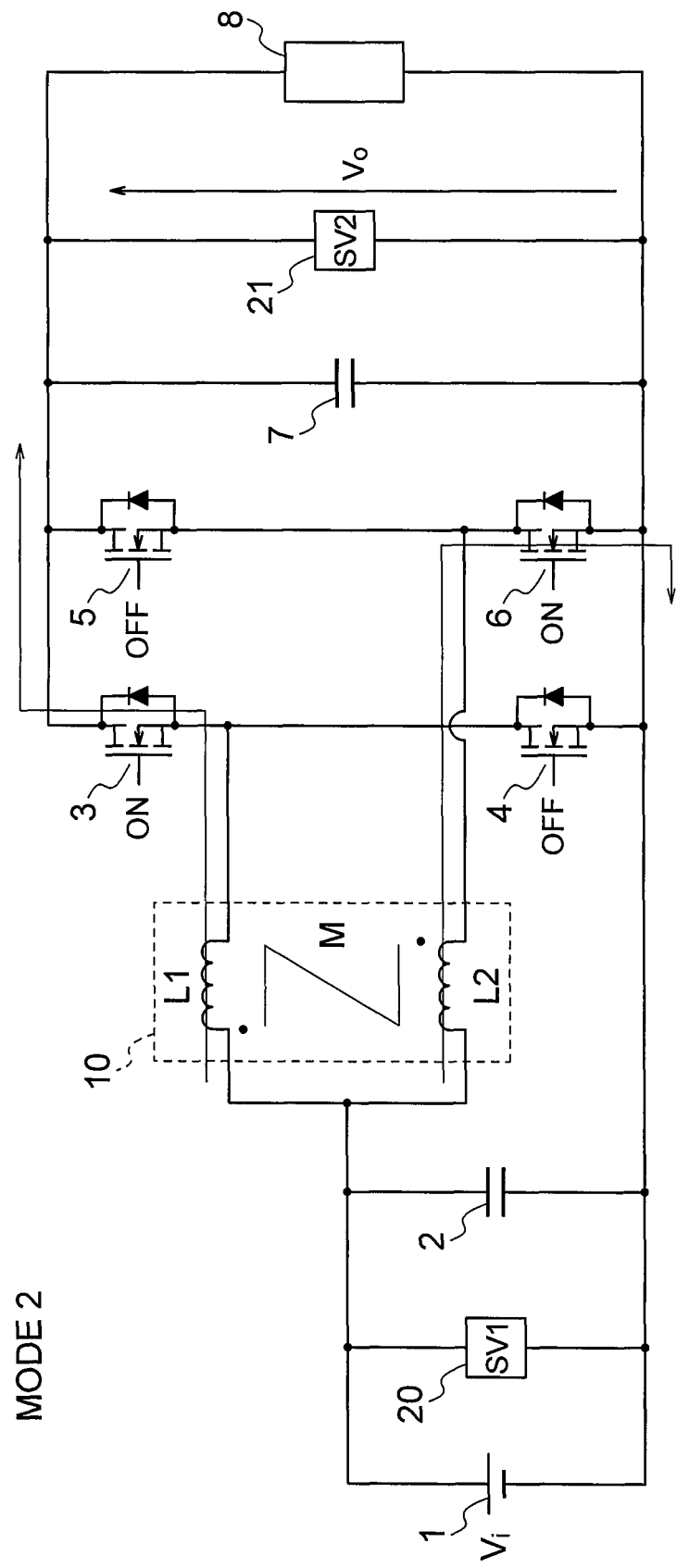
FIG. 3 is a diagram for illustrating another switching mode of semiconductor switching elements in the power conversion device according to the first embodiment of the present invention.

Mode 2 of FIG. 3 is a state opposite to Mode 1 in which the semiconductor switching element 4 is switched off, the semiconductor switching element 6 is switched on, the semiconductor switching element 3 is switched on, and the semiconductor switching element 5 is switched off.

Figure 4:
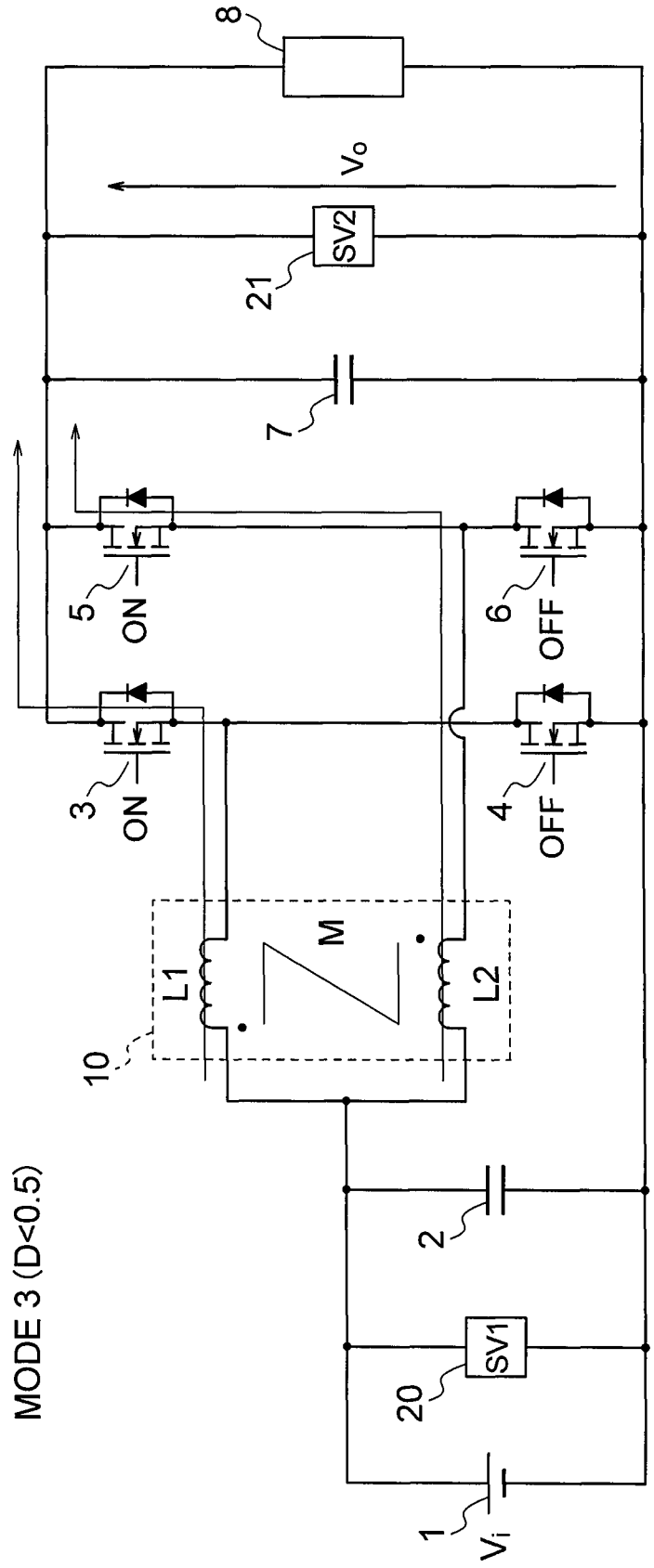
FIG. 4 is a diagram for illustrating still another switching mode of semiconductor switching elements in the power conversion device according to the first embodiment of the present invention.

Mode 3 of FIG. 4 is a state in which the semiconductor switching element 4 and the semiconductor switching element 6 are both switched off, and the semiconductor switching element 3 and the semiconductor switching element 5 are both switched on.

Figure 5:
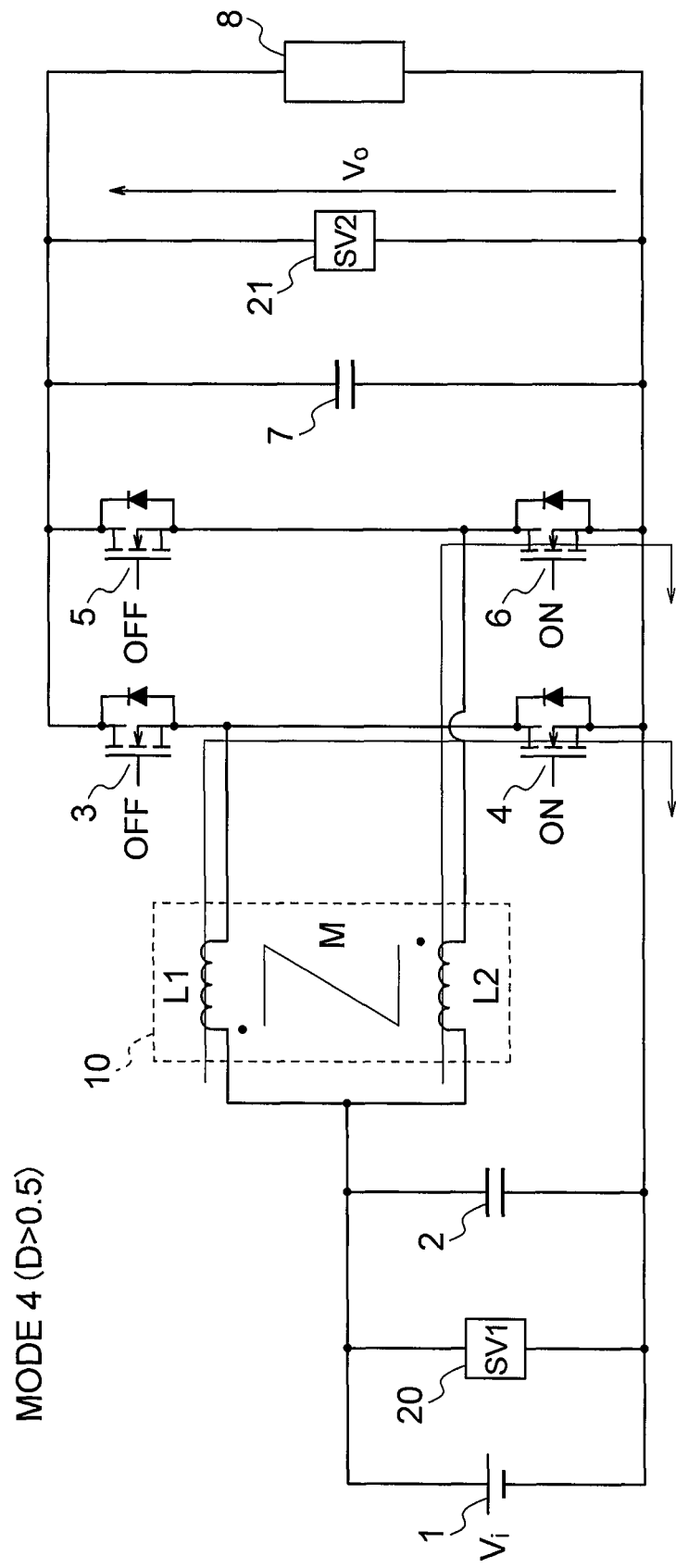
FIG. 5 is a diagram for illustrating yet still another switching mode of semiconductor switching elements in the power conversion device according to the first embodiment of the present invention.

Mode 4 of FIG. 5 is a state opposite to Mode 3 in which the semiconductor switching element 4 and the semiconductor switching element 6 are both switched on, and the semiconductor switching element 3 and the semiconductor switching element 5 are both switched off.

The controller 9 performs control with the phases of the semiconductor switching element 4 and the semiconductor switching element 6 staggered by half a cycle, in other words, with the phases shifted by 180°. The circuit operation appearance pattern accordingly changes at a switching duty ratio (D) of 0.5.

When the duty ratio is lower than 0.5 (D<0.5), a pattern "Mode 1→Mode 3→Mode 2→Mode 3" is repeated for each cycle. When the duty ratio is higher than 0.5 (D>0.5), a pattern "Mode 1→Mode 4→Mode 2→Mode 4" is repeated for each cycle. When the duty ratio is 0.5 (D=0.5), Mode 1 and Mode 2 are alternated repeatedly.

Figure 6:
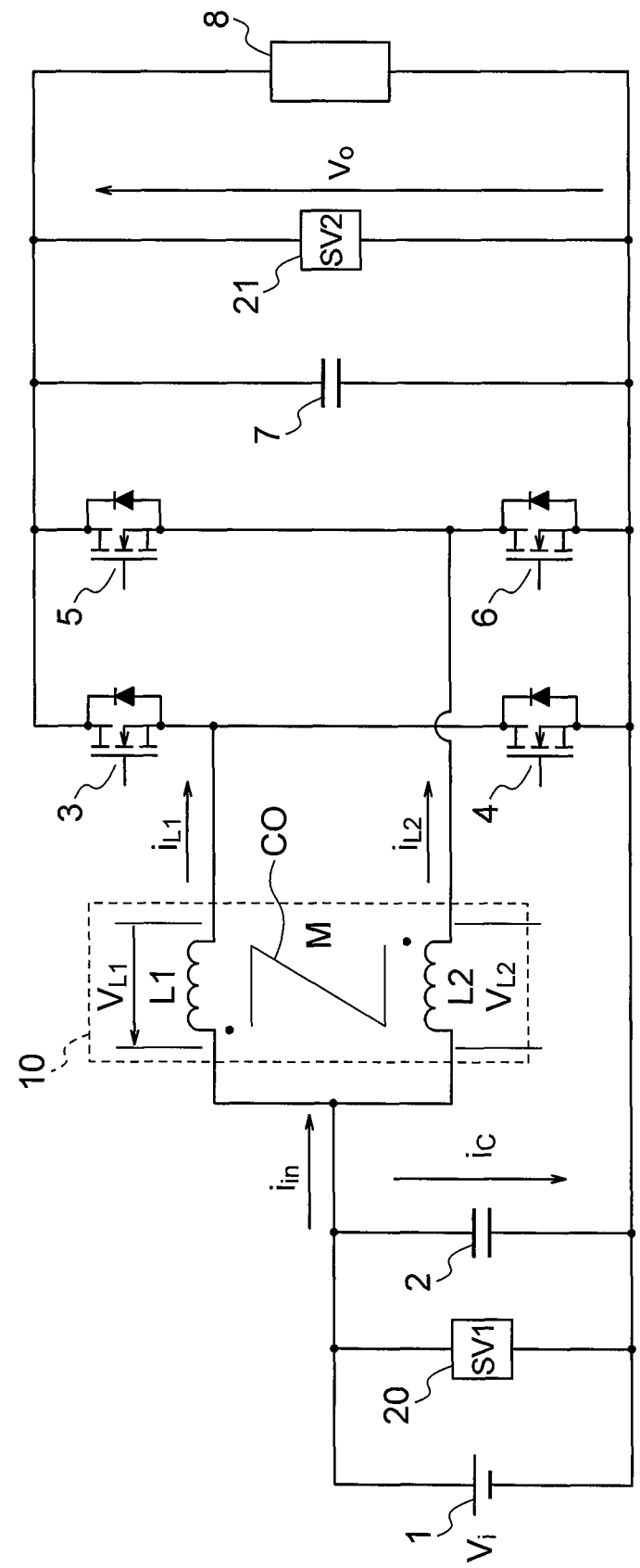
FIG. 6 is a circuit diagram of the power conversion device according to the first embodiment of the present invention.

FIG. 6 is a circuit diagram of the power conversion device according to the first embodiment. When the magnetic coupling reactor 10 has self-inductances $L_1$ and $L_2$, a mutual inductance M, voltages $v_{L1}$ and $v_{L2}$ applied to the winding wires, namely, the reactors L1 and L2, currents $i_{L1}$ and $i_{L2}$ flowing in the winding wires, namely, the reactors L1 and L2, and a composite current $i_{in}$ as illustrated in FIG. 6, the following relational expression is established:

$$\begin{cases} v_{L1} = L_1 \cdot \dfrac{di_{L1}}{dt} - M \cdot \dfrac{di_{L2}}{dt} \\ v_{L2} = L_2 \cdot \dfrac{di_{L2}}{dt} - M \cdot \dfrac{di_{L1}}{dt} \\ i_{in} = i_{L1} + i_{L2} \end{cases} \quad (1)$$

The voltages $v_{L1}$ and $v_{L2}$ applied in Mode 1 to Mode 4 vary from mode to mode, and the behavior of a current accordingly varies from mode to mode.

The voltages $v_{L1}$ and $v_{L2}$ in Mode 1, in which the semiconductor switching element 4 is switched on and the semiconductor switching element 6 is switched off as can be seen in FIG. 2, are Vi and Vi-Vo, respectively.

This is substituted in Expression (1) and the resultant expression is organized to obtain Expression (2).

$$\begin{cases} \dfrac{di_{L1}}{dt} = \dfrac{1}{L_1 \cdot L_2 - M^2} \cdot \{(L_2 + M) \cdot V_i - M \cdot V_o\} \\ \dfrac{di_{L2}}{dt} = \dfrac{1}{L_1 \cdot L_2 - M^2} \cdot \{(L_1 + M) \cdot V_i - L_1 \cdot V_o\} \\ \dfrac{di_{in}}{dt} = \dfrac{di_{L1}}{dt} + \dfrac{di_{L2}}{dt} \end{cases} \quad (2)$$

A power conversion device is normally designed so that parameters of the respective phases are symmetrical. When the parameters of the respective phases are assumed to be completely symmetrical and $L_1=L_2=L$ is established, Expression (2) is expressed as the following simpler expression:

$$\begin{cases} \dfrac{di_{L1}}{dt} = \dfrac{1}{L^2 - M^2} \cdot \{(L + M) \cdot V_i - M \cdot V_o\} \\ \dfrac{di_{L2}}{dt} = \dfrac{1}{L^2 - M^2} \cdot \{(L + M) \cdot V_i - L \cdot V_o\} \\ \dfrac{di_{in}}{dt} = \dfrac{2}{L - M} \cdot \left(V_i - \dfrac{V_o}{2}\right) \end{cases} \quad (3)$$

A similar calculation is performed for Mode 2 of FIG. 3. Mode 2, in which the switching state is opposite to the one in Mode 1 and the behavior of currents of the respective phases are accordingly opposite as well, is expressed by the following expression:

$$\begin{cases} \dfrac{di_{L1}}{dt} = \dfrac{1}{L^2-M^2} \cdot \{(L+M)\cdot V_i - L\cdot V_o\} \\ \dfrac{di_{L2}}{dt} = \dfrac{1}{L^2-M^2} \cdot \{(L+M)\cdot V_i - M\cdot V_o\} \\ \dfrac{di_{in}}{dt} = \dfrac{2}{L-M} \cdot \left(V_i - \dfrac{V_o}{2}\right) \end{cases} \quad (4)$$

The voltages $v_{L1}$ and $v_{L2}$ in Mode 3 of FIG. 4, in which both switches on the negative side are switched off, satisfy $v_{L1}=v_{L2}=V_i-V_o$. This is substituted in Expression (1) and the resultant expression is organized to obtain the following expression:

$$\dfrac{di_{L1}}{dt} = \dfrac{di_{L2}}{dt} = \dfrac{1}{L-M} \cdot (V_o - V_i) \quad (5)$$
$$\dfrac{di_{in}}{dt} = \dfrac{2}{L-M} \cdot (V_o - V_i)$$

The voltages $v_{L1}$ and $v_{L2}$ in Mode 4 of FIG. 5, in which both switches on the negative side are switched on, satisfy $v_{L1}=v_{L2}=V_i$. This is substituted in Expression (1) and the resultant expression is organized to obtain the following expression:

$$\dfrac{di_{L1}}{dt} = \dfrac{di_{L2}}{dt} = \dfrac{1}{L-M} \cdot V_i \quad (6)$$
$$\dfrac{di_{in}}{dt} = \dfrac{2}{L-M} \cdot V_i$$

Figure 7:
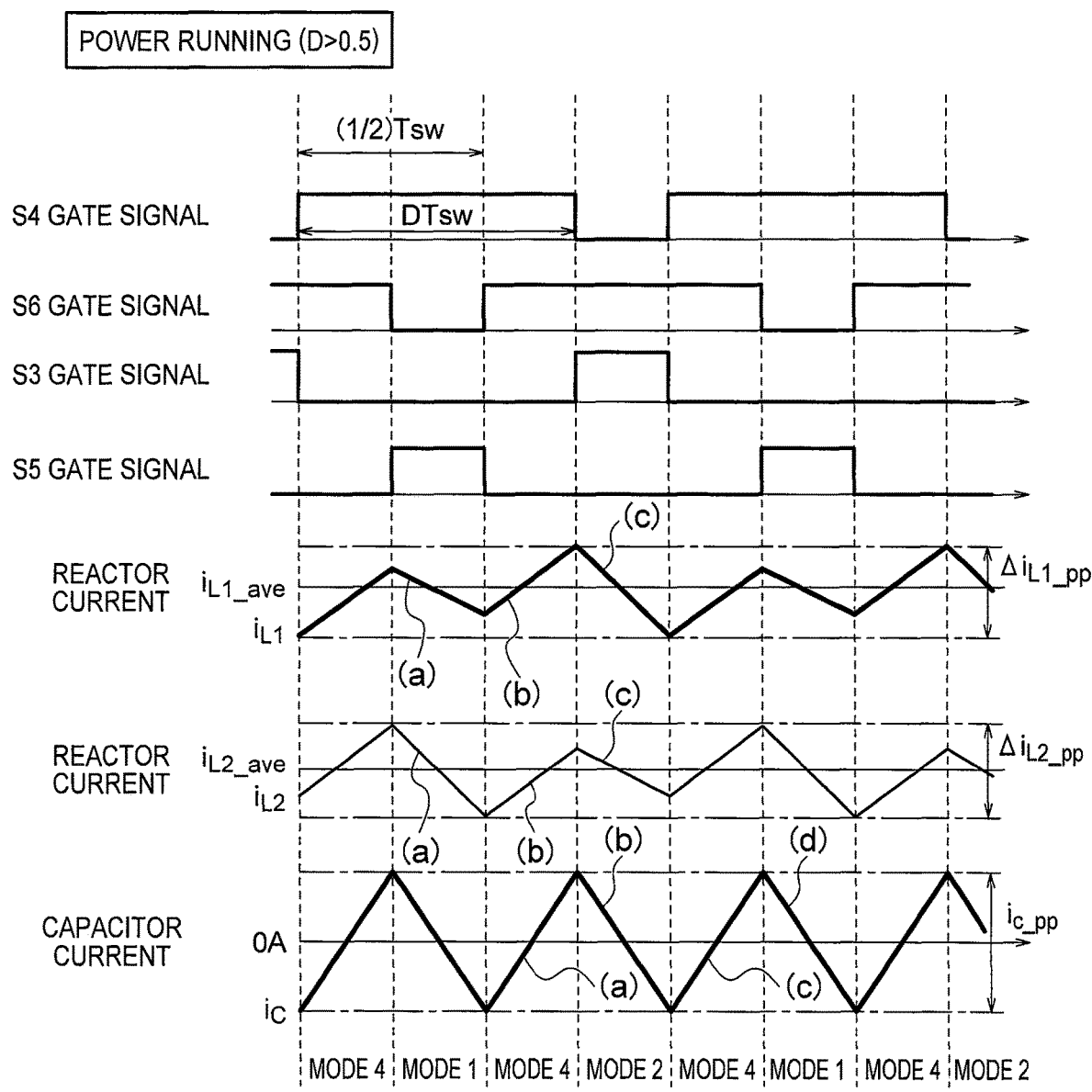
FIG. 7 is a time chart of signals and currents in units of the power conversion device according to the first embodiment of the present invention.

Voltages and current waveforms of the power conversion device obtained in the manner described above when the duty ratio is higher than 0.5 (D>0.5) are illustrated in FIG. 7 as an operation example. A current $i_c$ flowing in the input capacitor 2 is an alternating component of the composite current $i_{in}$.

In FIG. 7, the following are illustrated from the top downwards:

a switching cycle Tsw (in this case, a half cycle ½·Tsw) of the semiconductor switching elements;

gate signals (an on-duty part is indicated by $DT_{SW}$) to the semiconductor switching elements 4, 6, 3, and 5 sorted in this order with the semiconductor switching element 4 at the top;

the current $i_{L1}$ of the reactor L1 of the magnetic coupling reactor 10;

the current $i_{L2}$ of the reactor L2 of the magnetic coupling reactor 10; and the current $I_c$ ($=i_{in}$) of the input capacitor 2.

Mode 1 to Mode 4 illustrated in a lower part of FIG. 7 correspond to Mode 1 of FIG. 2 to Mode 4 of FIG. 5, respectively.

Each temporal change of currents of the reactor L1, the reactor L2, and the input capacitor 2 in parts (a) to (d) of FIG. 7 is expressed as below.

Reactor L1

(a)(c) $\dfrac{di_{L1}}{dt} = \dfrac{1}{L^2-M^2} \cdot \{(L+M)\cdot V_i - M\cdot V_o\}$ (b) $\dfrac{di_{L1}}{dt} = \dfrac{1}{L-M} \cdot V_i$ Reactor L2

(a)(c) $\dfrac{di_{L2}}{dt} = \dfrac{1}{L^2-M^2} \cdot \{(L+M)\cdot V_i - L\cdot V_o\}$ (b) $\dfrac{di_{L2}}{dt} = \dfrac{1}{L-M} \cdot V_i$ Input capacitor (a)(c) $\dfrac{di_{in}}{dt} = \dfrac{2}{L-M} \cdot V_i$ (b)(d) $\dfrac{di_{in}}{dt} = \dfrac{2}{L-M} \cdot \left(V_i - \dfrac{V_o}{2}\right)$ When average values of currents flowing in the respective phases are given as $i_{L1\_ave}$ and $i_{L2\_ave}$ and ripple currents flowing in the reactors L1 and L2 are given as $\Delta i_{L1\_pp}$ and $\Delta i_{L2\_pp}$ as can be seen in FIG. 7, maximum values $i_{L1max}$ and $i_{L2max}$ of the currents $i_{L1}$ and $i_{L2}$ flowing in the reactors L1 and L2 are expressed by the following expression:

$$\begin{cases} i_{L1max} = i_{L1\_ave} + \dfrac{\Delta i_{L1\_pp}}{2} \\ \quad = i_{L1\_ave} + \dfrac{1}{2}\cdot(1-D)\cdot T_{sw} \cdot \\ \qquad \left[\dfrac{1}{L^2-M^2}\cdot\{(L+M)\cdot V_i - L\cdot V_o\}\right] \\ i_{L2max} = i_{L2\_ave} + \dfrac{\Delta i_{L2\_pp}}{2} \\ \quad = i_{L2\_ave} + \dfrac{1}{2}\cdot(1-D)\cdot T_{sw} \cdot \\ \qquad \left[\dfrac{1}{L^2-M^2}\cdot\{(L+M)\cdot V_i - L\cdot V_o\}\right] \end{cases} \quad (7)$$

The maximum values ($i_{L1\_max}$ and $i_{L2\_max}$) of the respective currents are designed with the use of Expression (7) so as to be within the tolerable current value of current sensors.

The current sensors are the reactor current detection circuits 22a and 22b, which construct the current detector described later.

With reference to FIG. 7, an effective value ($i_{c\_rms}$) of the current flowing in the input capacitor 2 is expressed by the following expression:

$$i_{c\_rms} = \dfrac{i_{c\_pp}}{2\sqrt{3}} \quad (8)$$
$$= \dfrac{1}{2\sqrt{3}} \cdot \dfrac{2\cdot V_i}{L-M} \cdot \left(D - \dfrac{1}{2}\right)\cdot T_{sw}$$
$$= \dfrac{1}{\sqrt{3}} \cdot \dfrac{V_i}{L-M} \cdot \left(D - \dfrac{1}{2}\right)\cdot T_{sw}$$

When the coupling factor of the reactor L1 and reactor L2 of the magnetic coupling reactor 10 is given as k, the relation between the mutual inductance M and the self-inductances $L_1$ and $L_2$ is expressed as follows:

$$M = k\sqrt{L_1 \cdot L_2} \propto k \cdot L \quad (9)$$

Expression (9) is substituted in Expression (7) and Expression (8) to obtain Expression 11.

$$i_{L1max} = i_{L1\_ave} + \dfrac{1}{2}\cdot(1-D)\cdot T_{sw} \cdot \left(\dfrac{V_i}{L\cdot(1-k)} - \dfrac{V_o}{L\cdot(1-k^2)}\right) \quad (10)$$

-continued $$i_{L2max} = i_{L2\_ave} + \frac{1}{2} \cdot (1-D) \cdot T_{sw} \cdot \left( \frac{V_i}{L \cdot (1-k)} - \frac{V_o}{L \cdot (1-k^2)} \right)$$

$$i_{c\_rms} = \frac{1}{\sqrt{3}} \cdot \frac{V_i}{L(1-k)} \cdot \left( D - \frac{1}{2} \right) \cdot T_{sw}$$

It is generally conceivable that a common way to reduce the ripple current effective value $i_{c\_rms}$ of the input capacitor 2 under a condition that makes the ripple current maximum values $iL_{1\_max}$ and $i_{L2\_max}$ of the respective phases equal to or less than the tolerable value of the current sensors in Expression (10) is to raise the self-inductances L. However, a rise in the self-inductances L is accompanied by an increase in wire turns, an increase in volume of the core, which is an iron core, and the like, and leads to an increased conduction loss due to an increase in cost of the magnetic coupling reactor 10 and the length of the winding wires.

Figure 9:
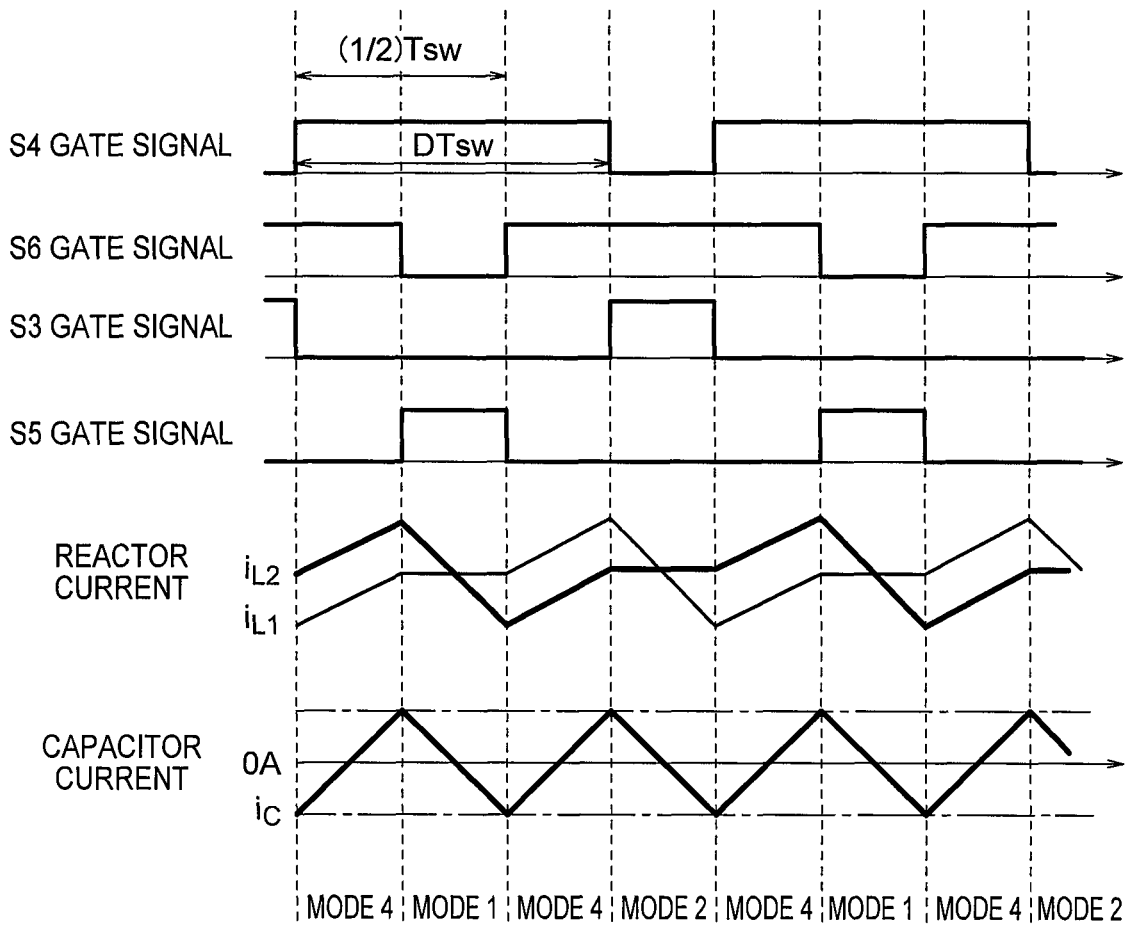
FIG. 9 is a time chart of signals and currents observed in units of the power conversion device according to the first embodiment of the present invention when the coupling factor is intermediate.
Figure 10:
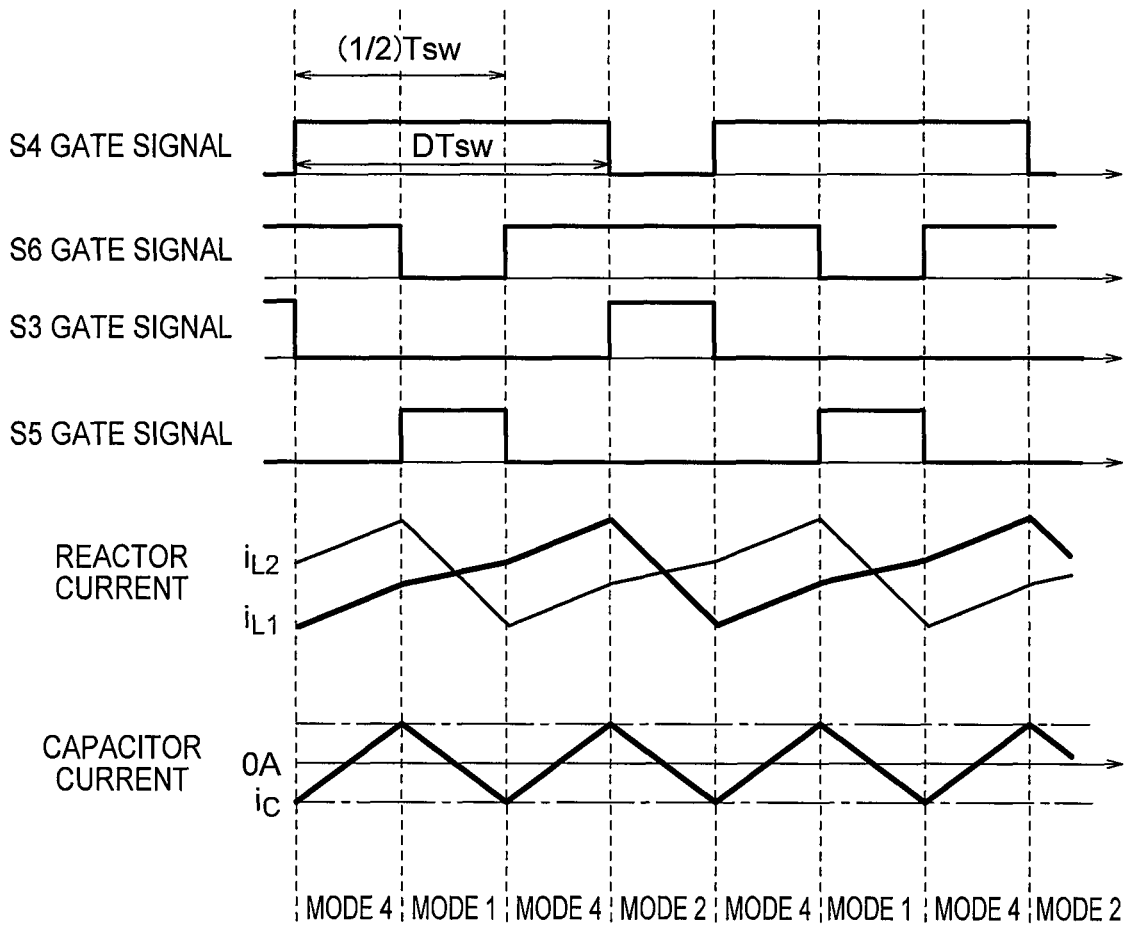
FIG. 10 is a time chart of signals and currents observed in units of the power conversion device according to the first embodiment of the present invention when the coupling factor is low.

The power conversion device according to the first embodiment of the present invention reduces the ripple current effective value $i_{c\_rms}$ of the input capacitor 2 by lowering a coupling factor k, without raising the self-inductances $L_1$ and $L_2$. Current waveforms at varied coupling factors are illustrated in FIG. 8 to FIG. 10.

Figure 8:
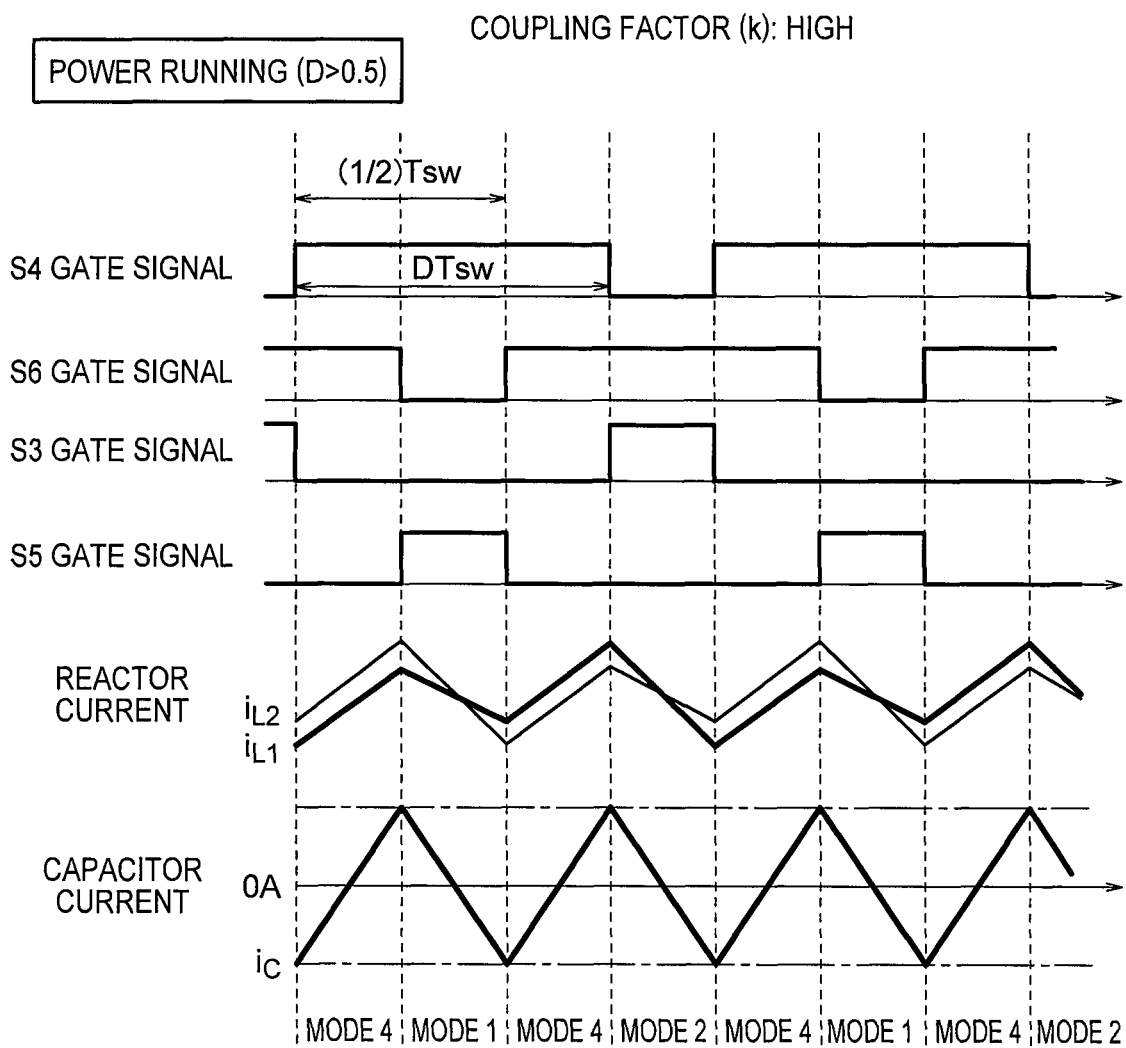
FIG. 8 is a time chart of signals and currents observed in units of the power conversion device according to the first embodiment of the present invention when the coupling factor is high.

Waveforms observed when the coupling factor k is high are illustrated in FIG. 8. Waveforms observed when the coupling factor k is intermediate are illustrated in FIG. 9. Waveforms observed when the coupling factor k is low are illustrated in FIG. 10. In FIG. 8 to FIG. 10, the following are illustrated from the top downwards as in FIG. 7:

the switching cycle Tsw of the semiconductor switching elements;

gate signals to the semiconductor switching elements 4, 6, 3, and 5 sorted in this order with the semiconductor switching element 4 at the top;

the currents of the reactors L1 and L2 of the magnetic coupling reactor 10; and the current of the input capacitor 2.

It is understood from FIG. 8 to FIG. 10 that the ripple current of the input capacitor 2 is smaller when the coupling factor k is lower. It is also understood from Expression (10) that the ripple current width is increased at a high coupling factor, for example, at a factor expressed by k≈1, even when the self-inductances L are high.

Figure 11:
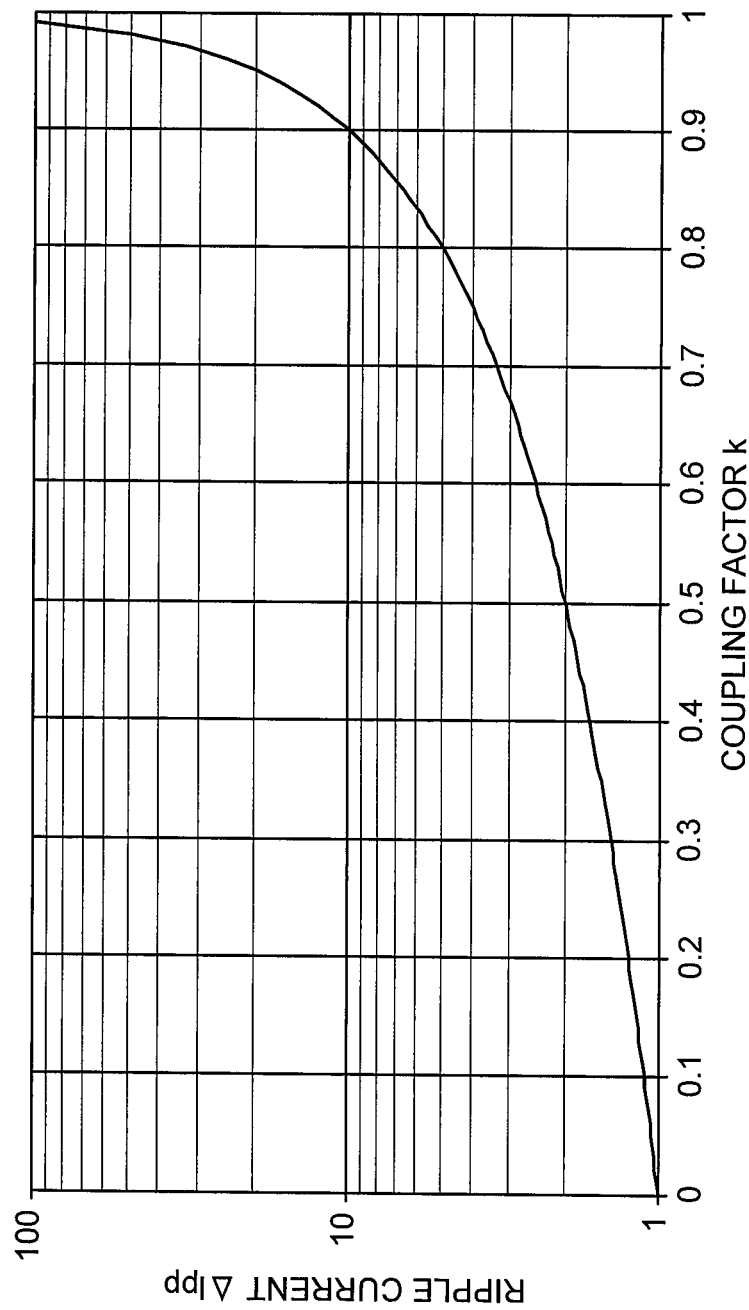
FIG. 11 is a graph for showing the relation between a ripple current of an input capacitor and a coupling factor of a magnetic coupling reactor in the power conversion device according to the first embodiment of the present invention.

The relation of the coupling factor k to the ripple current width at each coupling factor that is observed when the voltage boost rate is equal to or more than 2 (Vo/Vi≥2), and a ripple current ΔIpp at the coupling factor k of 0 is 1. The ripple current width is a standard value used when a component in which the coupling factor k is 0 is set to 1. It is understood from FIG. 11 that the ripple current width increases exponentially around when the coupling factor exceeds 0.8. The coupling factor is therefore desirably equal to or less than 0.8 at maximum. In other words, a preferred coupling factor of the magnetic coupling reactor 10 is 0.8, for example.

The coupling factor of the magnetic coupling reactor 10 is thus set to a value equal to or less than a set value determined by taking into consideration a range in which the ripple current of the input capacitor increases rapidly in response to a rise in coupling factor.

Second Embodiment

Figure 12:
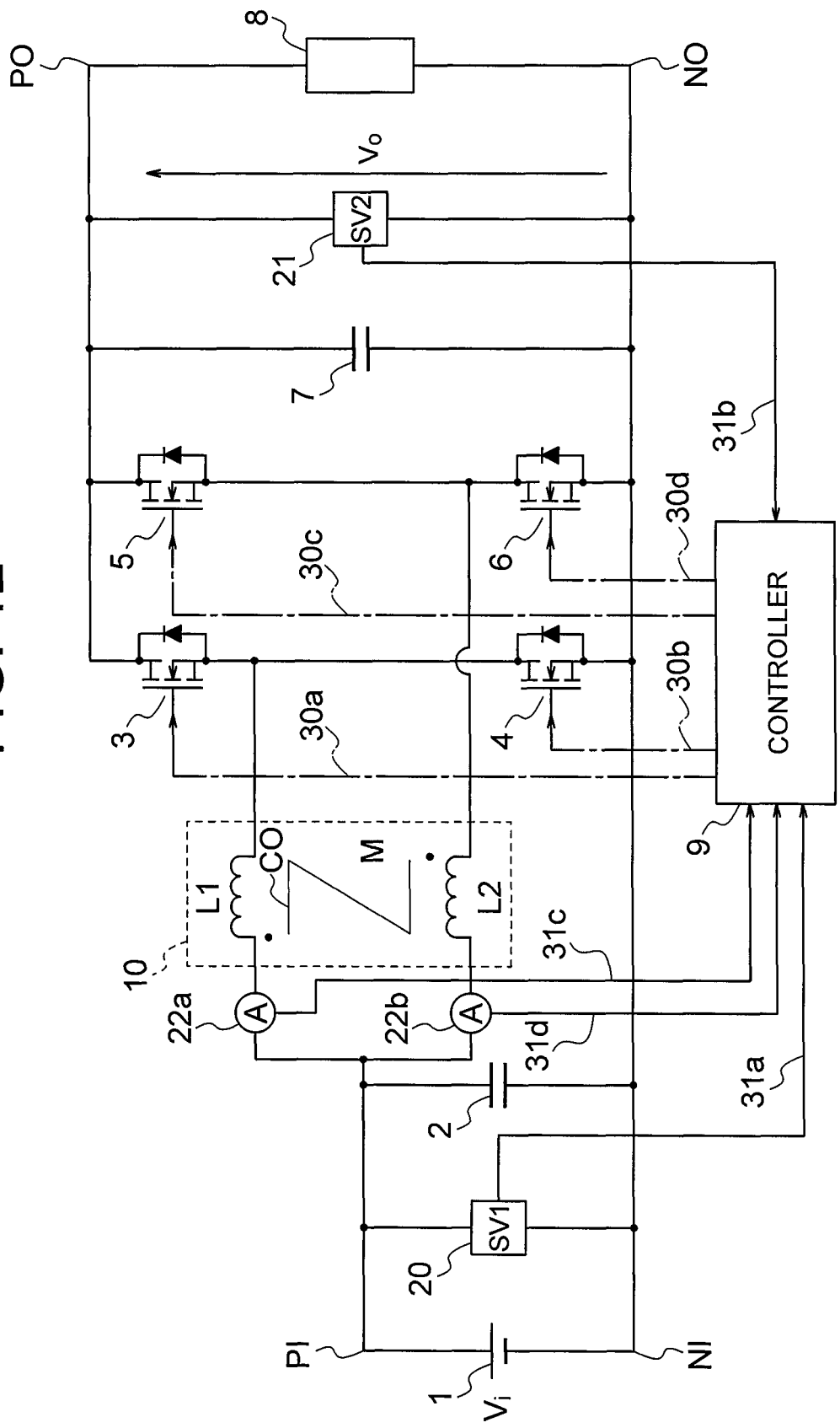
FIG. 12 is a schematic configuration diagram for illustrating a power conversion device according to a second embodiment of the present invention.

A power conversion device according to a second embodiment of the present invention is described. FIG. 12 is a schematic configuration diagram for illustrating the power conversion device according to the second embodiment of the present invention. The power conversion device according to the second embodiment has the same circuit configuration as that in the first embodiment, and includes the reactor current detection circuits 22a and 22b, which construct a current detector to measure the reactor currents $i_{L1}$ and $i_{L2}$ in the reactors L1 and L2, respectively, of the magnetic coupling reactor 10 as reactors having different phases.

The controller 9 of the power conversion device according to the second embodiment obtains current values from the reactor current detection circuits 22a and 22b to perform control so that the current of one phase and the current of another phase are equal to each other. The purpose thereof is to reduce a core loss of the magnetic coupling reactor 10 and maintain the magnetic permeability. In the magnetic coupling reactor 10 in which coils are coupled so that magnetism generated by one coil and magnetism generated by another coil have opposite phases. A magnetic flux generated when currents flow in the same direction is accordingly generated inside the core in directions in which a magnetic flux in one direction and a magnetic flux in another direction cancel each other.

Figure 13A:
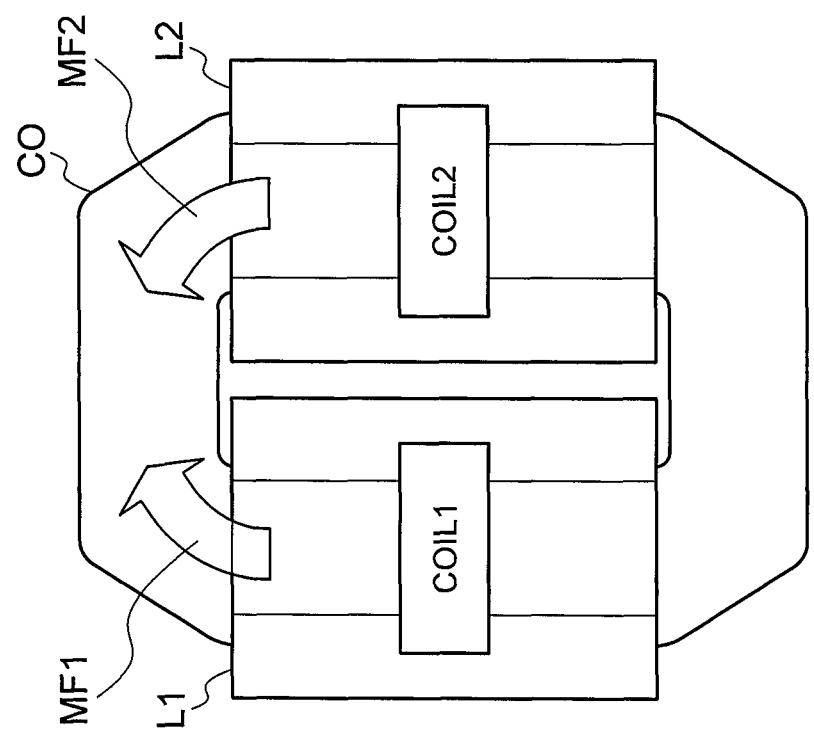
FIG. 13A and FIG. 13B are diagrams for illustrating a magnetic coupling reactor in a power conversion device according to the present invention.
Figure 13B:
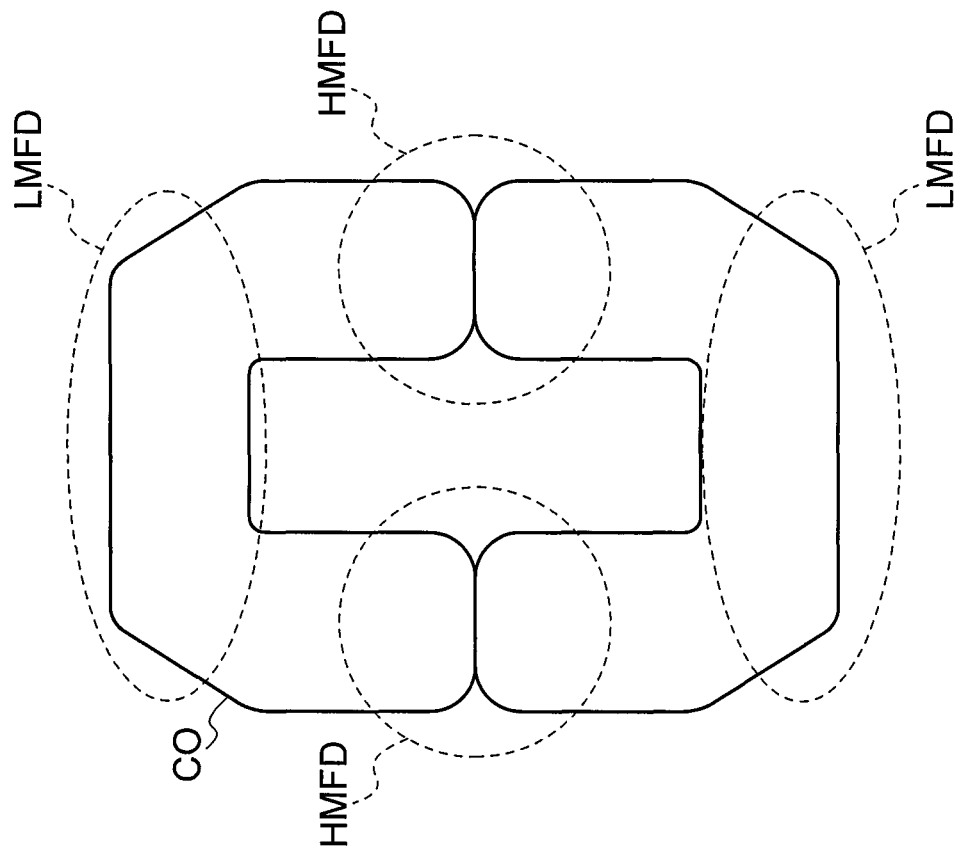

FIGS. 13 are diagrams for illustrating the magnetic coupling reactor 10. An example of the configuration of the magnetic coupling reactor 10 is illustrated in FIG. 13A. FIG. 13B is a diagram of an image of magnetic flux distribution. The magnetic coupling reactor 10 has a structure in which the core CO includes two U-shaped cores combined so as to form an O-shape as a whole. Coil wires COIL1 and COIL2, which correspond to the reactor L1 and the reactor L2, respectively, are wound around the core CO. The coil wires COIL1 and COIL2 are wound in directions that cause a magnetic flux MF1 of the coil wire COIL1 and a magnetic flux MF2 of the coil wire COIL2 to be generated in directions in which the magnetic fluxes cancel each other. FIG. 13B is a diagram of an image of magnetic flux distribution observed when the currents iL1 and iL2 of the respective phases flow in the same direction in this configuration. A low magnetic flux density area is indicated by LMFD, and a high magnetic flux density area is indicated by HMFD.

It is understood from FIG. 13B that the magnetic flux density is low in parts away from coil wire portions of the core CO. When a magnetic flux generated from the current $i_{Li}$ is given as $\Phi_1$ and a magnetic flux generated from the current $i_{L2}$ is given as $\Phi_2$, a magnetic flux in a part away from the coil wire portions of the core CO is obtained as a difference between a magnetic flux generated in one of the coil wire portions and a magnetic flux that is a part of the generated magnetic flux and that runs on the inner side of the core CO. When the magneto-resistance is given as Rm, and wire turns $N_1$ and wire turns $N_2$ are each equal to N, the magnetic fluxes are expressed in accordance with the Ohm's law for a magnetic circuit by the following expression:

$$\Phi_1 = \frac{N \cdot i_{L1}}{R_m} \quad (11)$$

$$\Phi_2 = \frac{N \cdot i_{L2}}{R_m}$$

At a low magnetic flux density, the magnetic permeability is high, which means that DC superposition characteristics are high and that the loss is small. The magnetic flux density after the magnetic flux generated by one coil wire and the magnetic flux generated by another coil wire cancel each other is closer to 0 when the generated magnetic fluxes are more uniform. The controller 9 therefore performs control so that a current of one phase is equal to a current of another phase. In this manner, in the power conversion device according to the second embodiment, it is possible to obtain an effect of maintaining high DC superposition characteristics by performing control with the controller 9 so that a current of one phase is equal to a current of another phase even when the amount of current is large, in addition to the effect described in the first embodiment in which the capacitor size is reduced by lowering the coupling factor.

Third Embodiment

A power conversion device according to a third embodiment of the present invention has the same circuit configuration as that of the power conversion device described in the first embodiment, but is characterized in that silicon carbide (SiC) semiconductor elements are used as the semiconductor switching elements 3 to 6.

In the electric vehicles such as HEVs and EVs, the voltage of a drive battery corresponding to the electricity storage 1 is generally high and is at least 100 V. A large amount of current flows in an electric circuit of an electric vehicle and, for that reason, an insulated gate bipolar transistor (IGBT) is used as a large current, high withstand voltage element in a boost converter or a similar power conversion device installed in the electric vehicle. However, a high frequency is desired for the switching frequency in recent years for further size reduction, and a SiC semiconductor device is used in place of an IGBT. The switching frequency is raised by using a SiC semiconductor element, with the result that magnetic parts are reduced in size.

In the case of the input capacitor 2, however, size reduction is achieved by reducing the ripple current itself flowing in the capacitor and, unless the ripple current changes, the reduced size of magnetic parts does not help in reducing the size of the input capacitor 2. It is conceivable that a common way to achieve the ripple current reduction, which is required to reduce the size of the input capacitor 2, is to raise the inductance of magnetic parts of the magnetic coupling reactor, but a raised inductance makes magnetic parts large in size.

Consequently, despite the size reduction achieved by raising the frequency, the capacitor size relatively increases, and the increased capacitor size affects the application itself, in other words, the size reduction of the power conversion device.

A power conversion device according to the present invention is to be applied to a high voltage, large capacity circuit, for example, a boost converter of an electric vehicle, and is most effective when driven at a high frequency. The power conversion device according to the third embodiment of the present invention is capable of reducing the size of the magnetic coupling reactor 10 by using SiC semiconductor elements as the semiconductor switching elements 3 to 6 and driving at a high frequency, and is also capable of reducing the ripple current of the input capacitor 2 and reducing the size of the input capacitor 2 as well by lowering the coupling factor of the magnetic coupling reactor 10.

Figure 14:
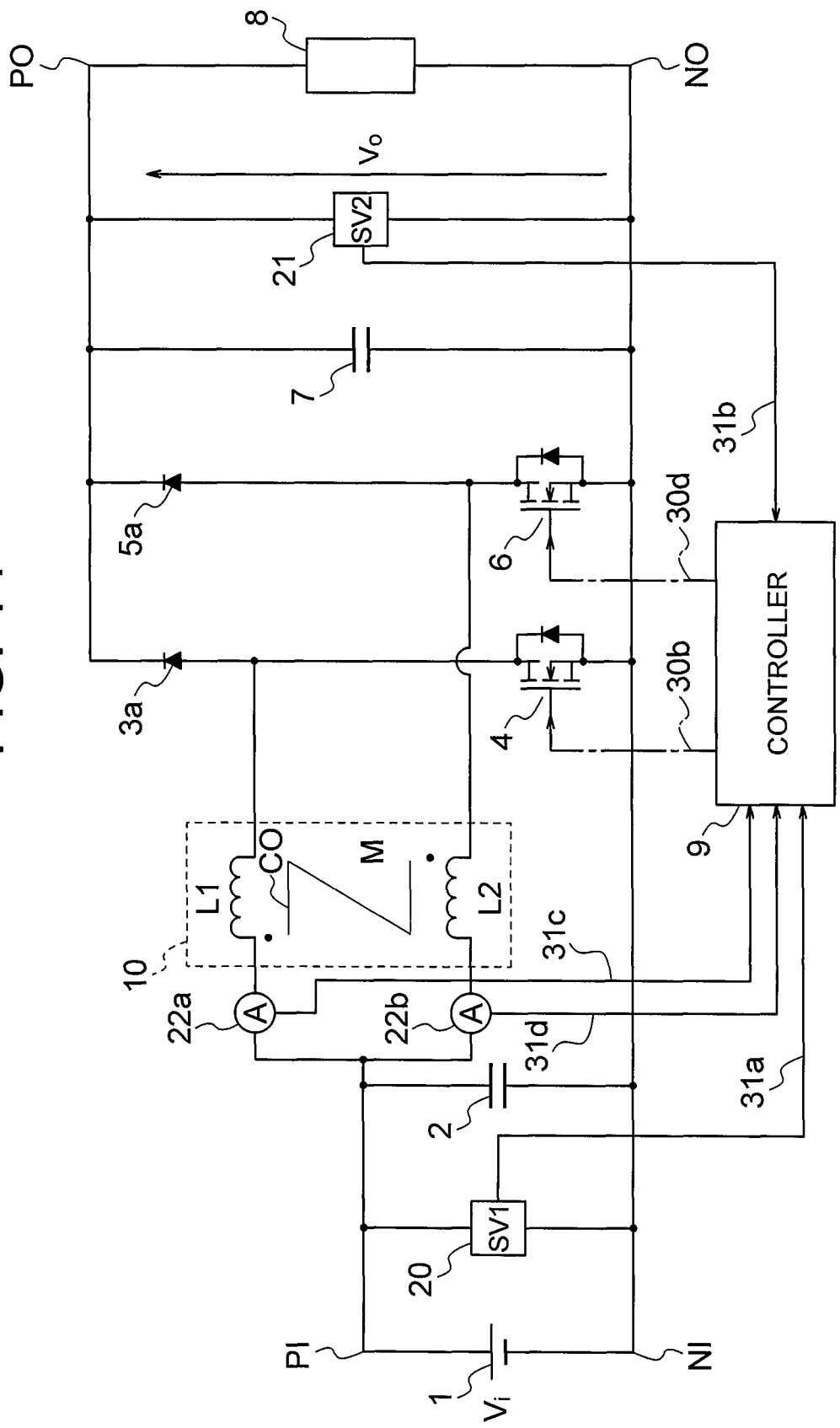
FIG. 14 is a schematic configuration diagram for illustrating a modification example of a power conversion device according to a third embodiment of the present invention.

In the embodiments described above, regenerative operation as well as power running operation is made possible by using the semiconductor switching elements 3 and 5 as switch elements. The present invention is not limited thereto, and the semiconductor switching elements 3 and 5 may be replaced by, for example, rectifier diodes 3a and 5a, which are rectifier elements, as illustrated in FIG. 14. Equivalent effects are obtained in this case, too.

The semiconductor switching elements 3 to 6 in the third embodiment are SiC-MOSFETs, namely, MOSFETS in which a semiconductor having SiC as a material is used. The semiconductor switching elements 3 to 6 may also be semiconductor elements in which a semiconductor having a gallium nitride-based (GaN-based) material or diamond as a material is used, as similarly wide bandgap semiconductor elements. Power semiconductor switching elements that are wide bandgap semiconductor elements can be used in a high voltage area in which it is difficult for a Si semiconductor to perform unipolar operation, and a switching loss caused during switching can accordingly be reduced significantly, which leads to a significant reduction in power loss. In addition, when a power module including a cooling device is constructed, the small power loss and high heat resistance of the power semiconductor switching elements that are wide bandgap semiconductor elements enable the power module to reduce the size of a heat dissipation fin of a heat sink, and to turn a water cooling device into an air cooling device, which enables further reduction in size of the semiconductor module. The power semiconductor switching elements formed of a wide bandgap semiconductor are also suitable for high frequency switching operation.

The present invention is receptive of modifications, within the scope of the present invention, in which the embodiments are combined freely or modified suitably.

INDUSTRIAL APPLICABILITY

The present invention is applicable to a high voltage power conversion device used in various fields.

The invention claimed is:

1. A power conversion device, which is configured to convert a voltage input from a power source into a desired direct current voltage, the power conversion device comprising:
  a first semiconductor switching element and a second semiconductor switching element, which are connected in series between a positive output terminal and a negative output terminal;
  a third semiconductor switching element and a fourth semiconductor switching element, which are connected in series between the positive output terminal and the negative output terminal and in parallel with the first semiconductor switching element and the second semiconductor switching element;
  a controller, which is configured to control on/off of each of the first semiconductor switching element, the second semiconductor switching element, the third semiconductor switching element, and the fourth semiconductor switching element;
  a magnetic coupling reactor including a first winding wire and a second winding wire, which are wound around a shared iron core so as to be magnetically coupled to each other in opposite directions at a turn ratio of 1:1, the first winding wire being connected between a first connection point connecting the first semiconductor switching element to the second semiconductor switching element and a positive input terminal, the second winding wire being connected between a second connection point connecting the third semiconductor switching element to the fourth semiconductor switching element and the positive input terminal; and
  an input capacitor, which is configured to reduce a ripple current, the input capacitor being connected, on a positive side thereof, to the positive input terminal and an input side of the magnetic coupling reactor, the input capacitor being connected, on a negative side thereof, to a negative input terminal and the negative output terminal, wherein the magnetic coupling reactor has a coupling factor equal to or less than a set value, the set value being determined based on the voltage input from the power source, a duty ratio applied by the controller, and a switching cycle applied by the controller, wherein the first connection point is directly connected only to the first semiconductor switching element, the second semiconductor switching element, and the first winding wire, wherein the second connection point is directly connected only to the third semiconductor switching element, the fourth semiconductor switching element, and the second winding wire, wherein the first winding wire and the second winding wire are directly connected to the input capacitor, and wherein the set value is 0.8.

2. The power conversion device according to claim 1, further comprising a current detector, which is configured to detect current values of the winding wires of the magnetic coupling reactor, wherein the controller is configured to perform control so that the current values detected by the current detector are equal to each other.

3. The power conversion device according to claim 2, wherein the first semiconductor switching element, the second semiconductor switching element, the third semiconductor switching element, and the fourth semiconductor switching element include wide bandgap semiconductor elements.

4. The power conversion device according to claim 1, wherein the first semiconductor switching element, the second semiconductor switching element, the third semiconductor switching element, and the fourth semiconductor switching element include wide bandgap semiconductor elements.

5. The power conversion device according to claim 4, wherein the wide bandgap semiconductor elements include semiconductor elements having, as a material thereof, one selected from the group consisting of silicon carbide, gallium nitride-based material, and diamond.

6. The power conversion device according to claim 1, wherein the power source includes a high voltage battery of 100 V or higher.

* * * * *